(12) United States Patent
Tamura et al.

(10) Patent No.: US 9,207,368 B2
(45) Date of Patent: Dec. 8, 2015

(54) LIGHT SHIELDING LENS FOR PROTECTIVE EYEGLASSES

(71) Applicants: Kanichi Tamura, Osaka (JP); Shoichi Mitsuuchi, Osaka (JP); Kenzo Wada, Osaka (JP)

(72) Inventors: Kanichi Tamura, Osaka (JP); Shoichi Mitsuuchi, Osaka (JP); Kenzo Wada, Osaka (JP)

(73) Assignee: TALEX OPTICAL CO., LTD., Osaka (JP)

(*) Notice: Subject to any disclaimer, the term of this patent is extended or adjusted under 35 U.S.C. 154(b) by 374 days.

(21) Appl. No.: 13/794,969

(22) Filed: Mar. 12, 2013

(65) Prior Publication Data

US 2013/0194658 A1 Aug. 1, 2013

Related U.S. Application Data

(63) Continuation-in-part of application No. PCT/JP2011/066931, filed on Jul. 26, 2011.

(30) Foreign Application Priority Data

Sep. 13, 2010 (JP) .................................. 2010-204063

(51) Int. Cl.
  *G02C 3/00* (2006.01)
  *G02B 5/00* (2006.01)
  (Continued)

(52) U.S. Cl.
  CPC ................ *G02B 5/003* (2013.01); *G02B 5/223* (2013.01); *G02C 7/108* (2013.01)

(58) Field of Classification Search
  CPC ........ G02C 7/00; G02C 7/1081; G02C 7/108; G02C 7/104; G02C 7/10

USPC ............ 351/159.01, 159.49, 159.59, 159.65, 351/159.73, 159.75, 159.29, 41, 44; 359/361

See application file for complete search history.

(56) References Cited

U.S. PATENT DOCUMENTS 5,296,519 A 3/1994 Otsuka
5,400,175 A * 3/1995 Johansen et al. .............. 359/361
(Continued)

FOREIGN PATENT DOCUMENTS

JP 04-134065 5/1992
JP 05-212103 8/1993
(Continued)

OTHER PUBLICATIONS

International Search Report issued Sep. 13, 2011 in International (PCT) Application No. PCT/JP2011/066931.
(Continued)

*Primary Examiner* — James Greece
(74) *Attorney, Agent, or Firm* — Wenderoth, Lind & Ponack, L.L.P.

(57) ABSTRACT

A light-shielding lens which can cut ultraviolet or visible radiation having wavelengths of 430 nm and shorter or of 500 nm and shorter and which can sufficiently satisfy users' demand for its color. The lens contains 0.01 to 2 parts by mass of an indole-based ultraviolet absorbing dye having a melting point of 140 to 150° C., based on 100 parts by mass of a synthetic resin forming the lens, and preferably further contains an oil-soluble dye, whereby the lens can cut ultraviolet and visible radiation having wavelengths of 430 nm and shorter. Since the predetermined amount of the indole-based ultraviolet absorbing dye is sufficiently dissolved in the synthetic resin, it efficiently reveals its expected function. The lens can thus cut ultraviolet and visible radiation having wavelengths of 430 nm and shorter, or even 500 nm and shorter, while keeping highly transparent light color.

10 Claims, 3 Drawing Sheets

(51) Int. Cl.
*G02B 5/22* (2006.01)
*G02C 7/10* (2006.01)

(56) References Cited

U.S. PATENT DOCUMENTS

| 2009/0239982 | A1 | 9/2009 | Amasaki et al. | |
|---|---|---|---|---|
| 2010/0118263 | A1 | 5/2010 | Tamura et al. | |
| 2010/0279150 | A1* | 11/2010 | Hatta et al. | 428/704 |
| 2011/0096289 | A1* | 4/2011 | Onizawa et al. | 351/159 |

FOREIGN PATENT DOCUMENTS

| JP | 06-324293 | 11/1994 |
|---|---|---|
| JP | 07-306387 | 11/1995 |
| JP | 08-287715 | 11/1996 |
| JP | 2846091 | 1/1999 |
| JP | 2000-147201 | 5/2000 |
| JP | 2003-107412 | 4/2003 |
| JP | 2008-273950 | 11/2008 |
| WO | 2008/133008 | 11/2008 |
| WO | 2009/093655 | 7/2009 |
| WO | 2009/139478 | 11/2009 |

OTHER PUBLICATIONS

Written Opinion of the International Searching Authority issued Sep. 13, 2011 in International (PCT) Application No. PCT/JP2011/066931 (with English translation).
Japanese Office Action issued Mar. 11, 2014 in corresponding Application 2010-204063 (with English translation).

* cited by examiner

LIGHT SHIELDING LENS FOR PROTECTIVE EYEGLASSES

TECHNICAL FIELD

This invention relates to a light shielding lens for medical eyeglasses, and particularly a lens for protective eyeglasses which cuts radiation of a specific wavelength range, thereby protecting the wearer's eyes.

BACKGROUND ART

It is known that by adding an inorganic or organic pigment or pigments capable of absorbing light of a specific wavelength range to eyeglass lenses, the anti-glare properties and visibility of such lenses improve.

Protective eyeglasses are used to shield against ultraviolet and visible radiation harmful to the wearer's eyes and to block transmission of light that can cause glare to the eyes.

If it is necessary to strictly avoid radiation that causes glare to the eyes, e.g. for a person who is suffering from retinitis pigmentosa, it is essential to completely cut ultraviolet and visible radiation having wavelengths of 500 nm and shorter.

If it is necessary to reduce glare to the eyes to some extent, e.g. for a person who is suffering from cataract, it is appropriate to use protective eyeglasses that can sufficiently cut radiation having wavelengths of 420 nm and shorter.

In order to keep wearing such protective eyeglasses while walking, anti-glare properties have to be adjusted such that the wearer can tell between the three colors of traffic signals. For this purpose, it is necessary to keep the light transmission at 75% or higher while keeping the ability to sufficiently cut radiation with wavelengths of 420 nm and shorter.

One known medical lens used for such protective sunglasses is a resin lens made mainly of diethylene glycol allyl carbonate, which is also generally known as "CR39", and containing organic cobalt, and formed by casting polymerization with a polarizing film buried in the resin, the lens having anti-glare properties and polarizing capability (see the below-identified Patent document 1).

A light shielding lens is also known which is dyed by a yellowish disperse dye having an absorption peak wavelength of 390 to 410 nm, a spectral transmittance of 0 to 70% at the absorption peak wavelength, and a molecular absorption coefficient at 20° C. of $2 \times 10^3$ at the absorption peak wavelength (see the below-identified Patent document 2).

Indole-based compounds are known as ultraviolet absorbing agents or anti-halation dyes which can be added to colored resin compositions, resin films, thermal recording materials, liquid crystal display materials, etc (see the below-identified Patent document 3).

PRIOR ART DOCUMENTS

Patent Documents

Patent document 1: JP Patent Publication 5-212103A
Patent document 2: JP Patent Publication 7-306387A
Patent document 3: JP Patent 2846091B

SUMMARY OF THE INVENTION

Object of the Invention

Conventional light shielding resin lenses as medical lenses as described above contain no ultraviolet absorbing agent which can be sufficiently dissolved in the resin, and it was difficult for these lenses to reliably cut ultraviolet and visible radiation having wavelengths of 430 nm and shorter.

For example, since that 2,3-benzopyrole-based compounds, i.e. indole-based compounds cannot be sufficiently dissolved in such a synthetic resin as diethylene glycol bis allyl carbonate (CR39), no one in the art considered using these compounds as ultraviolet absorbing agents in lenses. Thus, indole-based compounds have never been used as ultraviolet absorbing agents in lenses for cutting ultraviolet radiation.

Thus, no light shielding lenses for protective eyeglasses have been manufactured which contain an indole-based ultraviolet absorbing agent and which can cut not only ultraviolet radiation but also visible radiation having wavelengths of 430 nm and shorter.

Lenses on which chrome or a chrome oxide is deposited or lenses containing an organic cobalt compound are all yellowish or reddish in color. Thus such lenses are insufficient in color variation and cannot sufficiently satisfy users' demand for color.

It is difficult to solve all of these problems especially if it is desired to cut light having wavelengths up to 500 nm.

An object of the present invention is to provide a light shielding lens for protective eyeglasses which is free of the above-mentioned problems, which can cut ultraviolet and visible radiation having wavelengths of 430 nm and shorter, preferably 500 nm and shorter, and which is available in a wide color variation such that it can sufficiently satisfy users' demand for color.

Means for Achieving the Object

In order to achieve the above object, the present invention provides a light-shielding lens for protective eyeglasses, comprising 100 parts by mass of a synthetic resin and 0.01 to 2 parts by mass of an ultraviolet absorbing dye having a melting point of 140 to 150° C., wherein the lens cuts ultraviolet and visible radiation having wavelengths of 430 nm and shorter.

Since the light-shielding lens for protective eyeglasses comprising 100 parts by mass of a synthetic resin and 0.01 to 2 parts by mass of an ultraviolet absorbing dye having a melting point of 140 to 150° C., this ultraviolet absorbing dye can be sufficiently dissolved in the synthetic resin, and thus effectively absorb radiation of the predetermined wavelength range. The lens can thus reliably cut ultraviolet and visible radiation having wavelengths of 430 nm and shorter, while keeping sufficiently transparent light color.

If an oil-soluble dye is used as an additional ultraviolet absorbing agent, the indole-based ultraviolet absorbing agent is sufficiently dissolved in the synthetic resin if the content of this ultraviolet absorbing agent is within the above predetermined range, so that the indole-based ultraviolet absorbing agent can efficiently cut ultraviolet and visible radiation having wavelengths of 430 nm and shorter, whereas the oil-soluble dye can, according to its characteristics, sufficiently cut ultraviolet and visible radiation having wavelengths longer than 430 nm and/or even equal to or shorter than 430 nm.

If an yellowish oil-soluble dye is used as the above oil-soluble dye, it is possible to cut ultraviolet and visible radiation having wavelengths of the predetermined value and shorter, and the same time, the color of the lens can be adjusted to light yellow or brown too, according to users' demand.

By using a yellowish oil-soluble dye, the lens can cut ultraviolet and visible radiation having wavelengths of 500 nm and shorter.

If the light-shielding lens for protective eyeglasses of the invention includes an integrated polarizing film layer, such a polarized lens can cut ultraviolet and visible radiation having wavelengths of the predetermined value and shorter, and simultaneously prevent glare.

Advantages of the Invention

The light-shielding lens for protective eyeglasses according to the present invention contains a predetermined amount of indole-based ultraviolet absorbing agent having a predetermined melting point in a synthetic resin, and preferably further contains an oil-soluble dye as an additional ultraviolet absorbing dye. Thus, the lens can cut ultraviolet or visible radiation having wavelengths of 430 nm and shorter or 500 nm and shorter. Also, this lens is available in a wide color variation such that it can sufficiently satisfy users' demand for color.

BEST MODE FOR EMBODYING THE INVENTION

Figure 1:
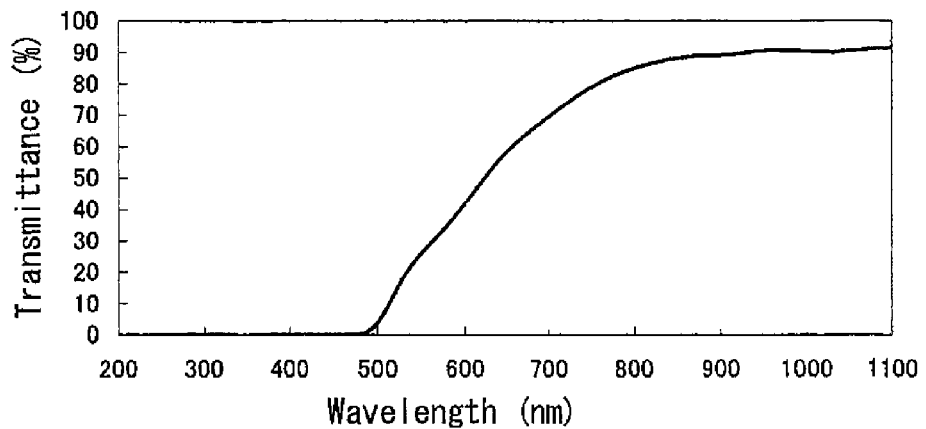
FIG. 1 is a graph showing an optical spectrum, and the relationship between the transmittance and wavelength, of Example 1.

The light-shielding lens for protective eyeglasses according to the present invention is directed to a lens made of a synthetic resin and containing an ultraviolet absorbing agent so as to shield against ultraviolet and visible radiation having wavelengths shorter than a predetermined value, and particularly a lens containing 0.01 to 2 parts by mass of an indole-based ultraviolet absorbing agent having a melting point of 140 to 150° C., based on 100 parts by mass of the synthetic resin, and capable of cutting ultraviolet and visible radiation having wavelengths of 430 nm and shorter.

The synthetic resin usable for the eyeglass lens according to the present invention is not particularly limited, and may be a thermoplastic resin such as an acrylic resin, a polystyrene resin or a polycarbonate resin, or a thermosetting resin such as an ally diglycol carbonate resin (which is also known as "CR-39" resin or "ADC" resin), a polyurethane resin or a polythiourethane resin.

The indole-based ultraviolet absorbing agent used in this invention is an compound which can at least absorb ultraviolet radiation and can absorb, according to its content, part of non-ultraviolet visible radiation, and which has an indole ring structure formed by condensing a benzene ring and a pyrrole ring. Specifically, this compound is selected from known indole-based ultraviolet absorbing agents, such as 4-(1H-indole)-3-ylmethylene-2-phenyloxazorine-5-one, 3-(β-cyano-β-benzoyl-vinyl)indole, or BONASORB UA-3912, made by Orient Chemical Industries Co., Ltd., and having a melting point of 140 to 150° C., preferably 142 to 146° C.

If the indole-based ultraviolet absorbing agent has a melting point higher than the above predetermined range, its compatibility, i.e. solubility in the resin forming the lens tends to insufficient. Since it is difficult to dissolve a sufficient amount of such an absorbing agent in the resin, such an absorbing agent cannot sufficiently absorb ultraviolet and visible radiation. If the indole-based ultraviolet absorbing agent has a melting point lower than the above predetermined range, when this compound is added to the resin and the resin is subjected to melt molding, this compound will volatilize, thus lowering the light-shielding ability of the lens.

It is possible to reduce the melting point of an indole-based absorbing agent having a ordinary chemical formula by reducing its molecular weight, thereby allowing the molecules to be more freely rotatable and reducing the intermolecular force and the chemical bonding force.

The content of the indole-based ultraviolet absorbing agent is 0.01 to 2 parts by mass, preferably 0.1 to 1 part by mass, based on 100 parts by mass of the synthetic resin so that this agent can be sufficiently dissolved in the synthetic resin, and can efficiently cut harmful light. The lens thus obtained is of a light color with high transparency.

If the content of this absorbing agent is lower than the above predetermined range, the lens cannot sufficiently cut ultraviolet and visible radiation, especially radiation having wavelengths of 430 nm and shorter. If this content is higher than the above predetermined range, it is difficult to provide a lens of a light color with high transparency.

An oil soluble dye is preferably used as an additional ultraviolet absorbing agent because such a dye is inexpensive and can improve the ability of the ultraviolet absorbing agent to cut ultraviolet radiation. Especially if it is necessary to cut ultraviolet and visible radiation having wavelengths of 500 nm and shorter, a yellowish oil-soluble dye or dyes are preferably used.

Such oil-soluble dyes are ordinary dyes soluble in organic solvents and thus soluble in the material to be formed into eyeglass lenses. Specific such dyes include blue, green, yellow, brown or black anthraquinone-based oil-soluble dyes, azo-based oil-soluble dyes, metal complex-based dyes, phthalocyanine-based dyes, and triarylmethane dyes.

The light-shielding lens for protective eyeglasses according to the invention is preferably a polarized lens including an integral polarizing film layer to improve anti-glare properties.

The polarizing film in such a polarized lens can be obtained by a known method. For example, the polarizing film is preferably formed by introducing, e.g. by impregnation, iodine, an iodine compound or a dye into a polyvinyl alcohol film, and uniaxially stretching the film.

Such a polarized eyeglass lens can be manufactured by insert molding in which a polarizing film is placed in a lens molding cavity to leave a gap of e.g. 1 to 15 mm on either side of the film, a lens material is injected into the gaps on both sides of the film to embed the film in the lens material, and the film is allowed to be integrated with the lens material. The thus obtained lens is ground and/or polished according to the required lens strength as an end product.

Figure 8:
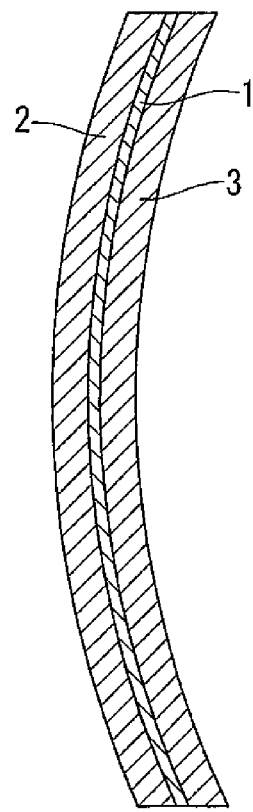
FIG. 8 is a sectional view of a polarized lens including a polarizing film.

Otherwise, such a polarized lens may be formed by another known method in which a polarizing film is laminated between two preformed lens substrates. FIG. 8 shows such a polarized lens, which includes lens substrates 2 and 3, and a polarizing film 1 sandwiched between the lens substrates 2 and 3.

An infrared absorbing agent may be added to the light-shielding lens according to the present invention so that the lens can absorb infrared radiation too. By selecting a desired infrared absorbing agent such as one that absorbs the entire infrared radiations or one that absorbs only near-infrared radiation having a wavelength of 800 nm or 1000 nm, it is possible to adjust the wavelength range which can be absorbed by the infrared absorbing agent.

The light-shielding lens according to this invention may be subjected to hard coating treatment. For example, the lens may be immersed in a solution containing a silicon compound to form reinforced films on the lens. The lens may also be subjected to any other known treatment, such as soil-resistant treatment, anti-reflective treatment, chemical-resistant treatment, anti-static treatment, or mirror-finish treatment to further improve the performance of the lens.

Example 1

A liquid lens-forming material was prepared by adding 1.5 parts by mass of an indole-based ultraviolet absorbing agent (BONASORB UA-3912, CAS. No. 102311-49-9, made by Orient Chemical Industries Co., Ltd.; melting point: 142 to 146° C.) to 100 parts by mass of CR-39 (diethylene glycol bis allyl carbonate), which is a liquid monomer of ADC resin, containing a polymerization initiator IPP (diisopropyl peroxydicarbonate), mixing and agitating them together with a suitable amount of a solvent, and deaerating them under vacuum. The lens-forming material was injected into the cavity of a lens forming glass mold having convex and concave surfaces with a gasket set therein, to the thickness of 2 mm.

The lens-forming material was gradually heated from room temperature, cured at 120° C. for four hours, cooled and removed from the mold, and annealed at 100° C. for two hours to obtain a brownish lens having a transmittance of about 40%.

The lens obtained was measured for its optical spectrum using a spectrophotometer U-2000 made by Hitachi, Ltd. The relationship between the wavelength and transmittance is shown in FIG. 1.

Example 2

A liquid lens-forming material was prepared by adding 0.3 parts by mass of an indole-based ultraviolet absorbing agent (BONASORB UA-3912, CAS. No. 102311-49-9, made by Orient Chemical Industries Co., Ltd.; melting point: 142 to 146° C.) and 0.008 parts by mass of an oil-soluble dye (Orasol Yellow 2GLN made by Ciba-Geigy), to 100 parts by mass of a mixture of Liquids A and B as raw materials of a high refractive index resin (thiourethane resin MR-7, made by Mitsui Chemicals, Inc.; refractive index: 1.67) which is a compound of an isocyanate and a polythiol, mixing and agitating them, and deaerating them under vacuum. The lens-forming material was injected into the cavity of a lens forming glass mold having convex and concave surfaces with a gasket set therein, to the thickness of 2 mm.

Figure 2:
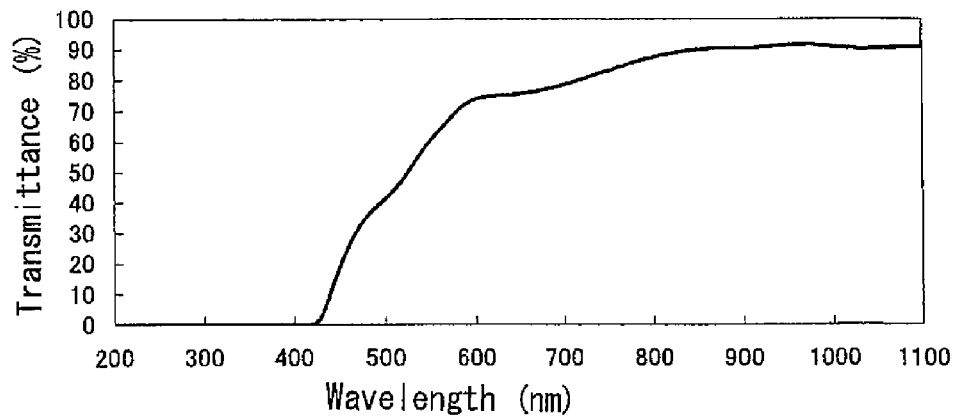
FIG. 2 is a graph showing an optical spectrum, and the relationship between the transmittance and wavelength, of Example 2.

The lens-forming material was gradually heated from room temperature, cured at 120° C. for four hours, cooled and removed from the mold, and annealed at 100° C. for two hours to obtain a brownish lens having a transmittance of about 65%. Its optical spectrum was measured in the same manner as above, and the relationship between the wavelength and transmittance is shown in FIG. 2.

Example 3

A liquid lens-forming material was prepared by adding 0.15 parts by mass of an indole-based ultraviolet absorbing agent (BONASORB UA-3912, CAS. No. 102311-49-9, made by Orient Chemical Industries Co., Ltd.; melting point: 142 to 146° C.) and 0.004 parts by mass of an oil-soluble dye (Orasol Yellow 2GLN made by Ciba-Geigy), to 100 parts by mass of a polyurethane resin material containing as a major component a prepolymer obtained by reacting a polyisocyanate with a polyhydroxy compound, and further containing as a curing agent an aromatic polyamine (MOCA), mixing and agitating them, and deaerating them under vacuum. The lens-forming material was injected into the cavity of a lens forming glass mold having convex and concave surfaces with a gasket set therein, to the thickness of 2 mm.

Figure 3:
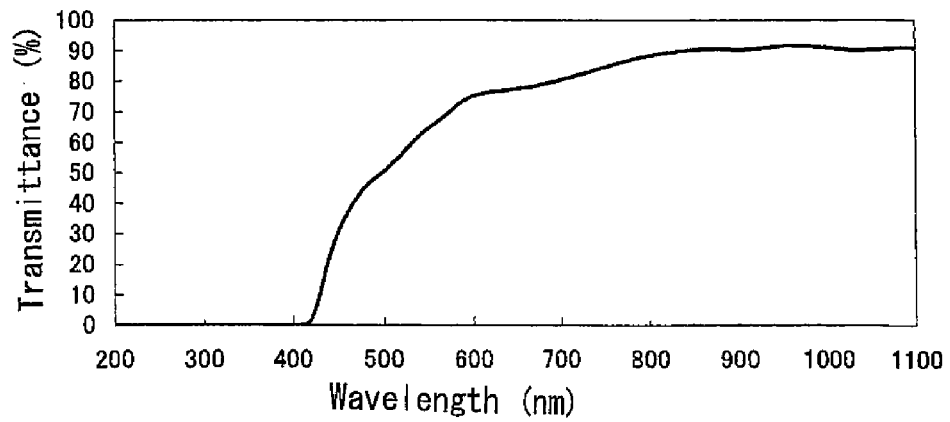
FIG. 3 is a graph showing an optical spectrum, and the relationship between the transmittance and wavelength, of Example 3.

The lens-forming material was gradually heated from room temperature, cured at 120° C. for four hours, cooled and removed from the mold, and annealed at 100° C. for two hours to obtain a light yellow lens having a transmittance of about 75%. Its optical spectrum was measured in the same manner as above, and the relationship between the wavelength and transmittance is shown in FIG. 3.

Example 4

A liquid lens-forming material was prepared by adding 1.5 parts by mass of an indole-based ultraviolet absorbing agent (BONASORB UA-3912, CAS. No. 102311-49-9, made by Orient Chemical Industries Co., Ltd.; melting point: 142 to 146° C.) to 100 parts by mass of CR-39 (diethylene glycol bis allyl carbonate), which is a liquid monomer of ADC resin, containing a polymerization initiator IPP (diisopropyl peroxydicarbonate), mixing and agitating them together with a suitable amount of a solvent, and deaerating them under vacuum. The lens-forming material was injected into the cavity of a lens forming glass mold having convex and concave surfaces with a polarizing element (polarizing film) inserted therein and with a gasket set therein, to the thickness of 2 mm.

The lens-forming material was gradually heated from room temperature, cured at 100° C. for eight hours, cooled and removed from the mold, and annealed at 90° C. for two hours to obtain a brown lens having a transmittance of about 30%.

A plurality of such polarizing elements (polarizing films) were separately formed as follows. After uniaxially stretching polyvinyl alcohol films (commonly known as "Vinylon films") having a thickness of 0.075 mm by four times, the films were immersed in an aqueous solution containing 0.1% by weight of iodine (dye solution), and then immersed in an aqueous solution containing 3% by weight of borate. Then after removing the liquid content, the films were subjected to heat treatment at 70° C. for five minutes to obtain polarizing films (0.03 mm thick).

The polarizing films thus obtained were formed into a spherical shape by pressing them against a spherical glass surface. A urethane-based adhesive (Polyonate 1000, made by Toyo Polymer Co., Ltd.) was applied to both sides of each polarizing film and dried.

Figure 4:
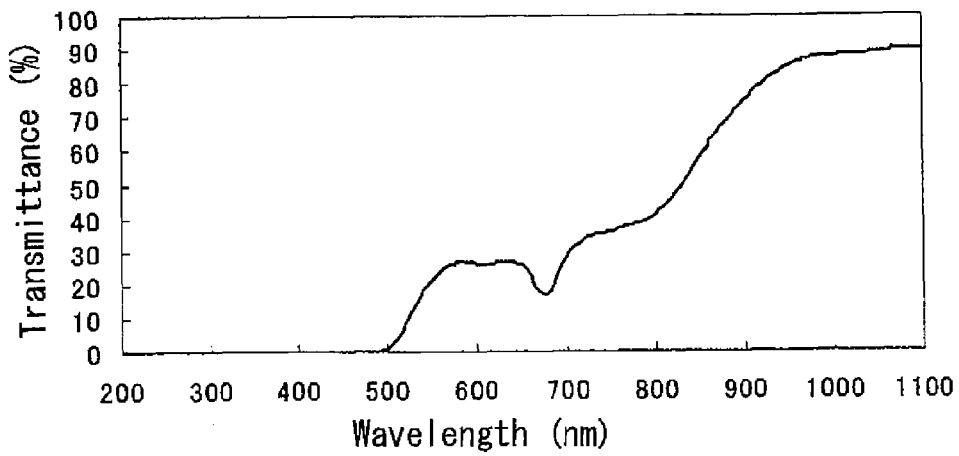
FIG. 4 is a graph showing an optical spectrum, and the relationship between the transmittance and wavelength, of Example 4.

The optical spectrum of the lens was measured in the same manner as above, and the relationship between the wavelength and transmittance is shown in FIG. 4.

Example 5

A liquid lens-forming material was prepared by adding 0.8 parts by mass of an indole-based ultraviolet absorbing agent (BONASORB UA-3912, CAS. No. 102311-49-9, made by Orient Chemical Industries Co., Ltd.; melting point: 142 to 146° C.) and 0.025 parts by mass of an oil-soluble dye (Orasol Yellow 2GLN, made by Ciba-Geigy), to 100 parts by mass of CR-39 (diethylene glycol bis allyl carbonate), which is a liquid monomer of ADC resin, containing a polymerization initiator IPP (diisopropyl peroxydicarbonate), mixing and agitating them together with a suitable amount of a solvent, and deaerating them under vacuum. The lens-forming material was injected into the cavity of a lens forming glass mold having convex and concave surfaces with a polarizing element inserted therein and with a gasket set therein, to the thickness of 2 mm.

The lens-forming material was gradually heated from room temperature, cured at 100° C. for eight hours, cooled and removed from the mold, and annealed at 90° C. for two hours to obtain a brown lens having a transmittance of about 40%.

Figure 5:
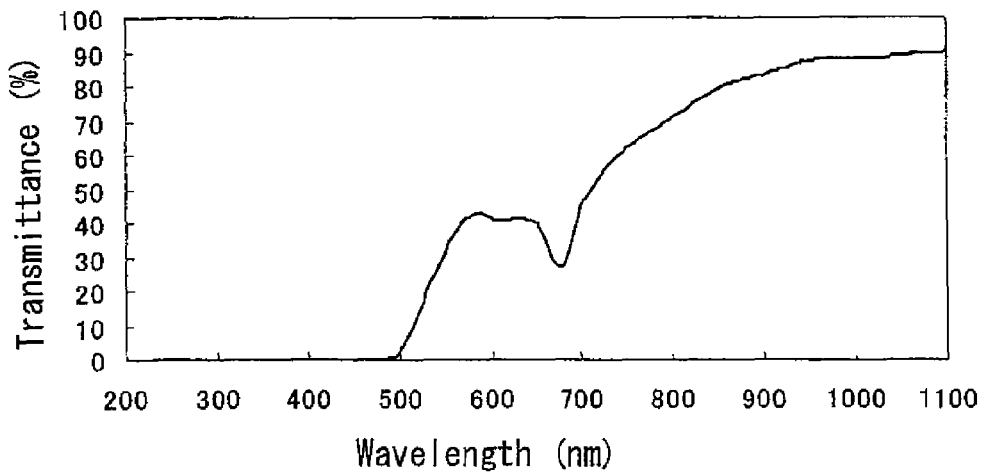
FIG. 5 is a graph showing an optical spectrum, and the relationship between the transmittance and wavelength, of Example 5.

Its optical spectrum was measured in the same manner as above, and the relationship between the wavelength and transmittance is shown in FIG. 5.

Comparative Example 1

A liquid lens-forming material was prepared by adding 1.0 part by mass of a benzotriazole-based ultraviolet absorbing agent (SEESORB 709. made by Shipro Kasei Kaisha, Ltd.) to 100 parts by mass of CR-39 (diethylene glycol his allyl carbonate), which is a liquid monomer of ADC resin, containing a polymerization initiator IPP (diisopropyl peroxydicarbonate), mixing and agitating them together with a suitable amount of a solvent, and deaerating them under vacuum. The lens-forming material was injected into the cavity of a lens forming glass mold having convex and concave surfaces with a gasket set therein, to the thickness of 2 mm.

The lens-forming material was gradually heated from room temperature, cured at 100° C. for eight hours, cooled and removed from the mold, and annealed at 90° C. for two hours to obtain a light yellow lens having a transmittance of about 85%.

Figure 6:
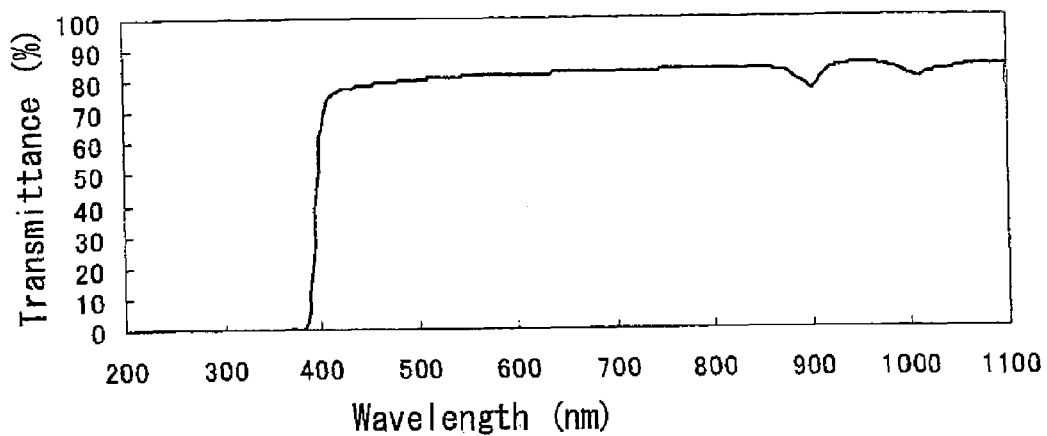
FIG. 6 is a graph showing an optical spectrum, and the relationship between the transmittance and wavelength, of Comparative Example 1.

Its optical spectrum was measured in the same manner as above. The relationship between the wavelength and transmittance is shown in FIG. 6.

Comparative Example 2

A liquid lens-forming material was prepared by adding 0.1 parts by mass of red and yellow organic dyes to 100 parts by mass of CR-39 (diethylene glycol bis allyl carbonate), which is a liquid monomer of ADC resin, containing a polymerization initiator IPP (diisopropyl peroxydicarbonate), mixing and agitating them together with a suitable amount of a solvent, and deaerating them under vacuum. The lens-forming material was injected into the cavity of a lens forming glass mold having convex and concave surfaces with a polarizing element inserted therein and with a gasket set therein, to the thickness of 2 mm.

The lens-forming material was gradually heated from room temperature, cured at 100° C. for eight hours, cooled and removed from the mold, and annealed at 90° C. for two hours to obtain a light yellow lens having a transmittance of about 15%.

Figure 7:
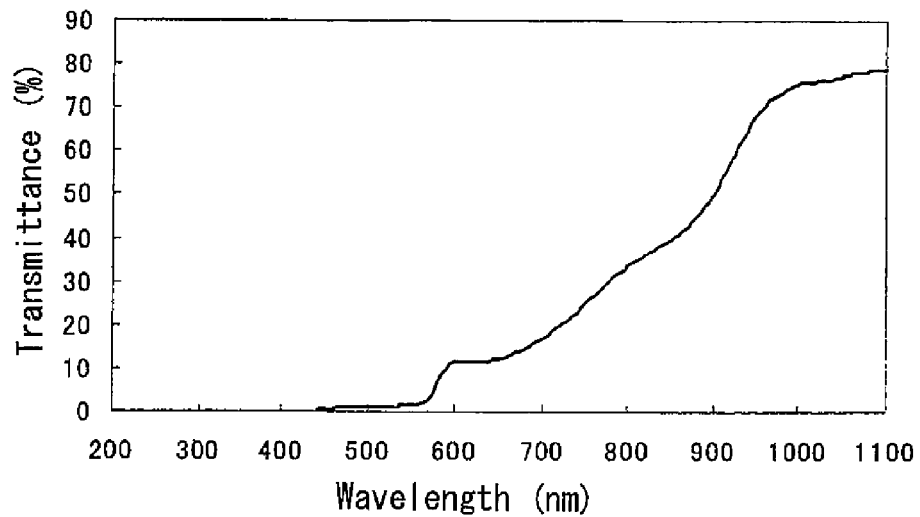
FIG. 7 is a graph showing an optical spectrum, and the relationship between the transmittance and wavelength, of Comparative Example 2.

Its optical spectrum was measured in the same manner as above. The relationship between the wavelength and transmittance is shown in FIG. 7.

Comparative Example 3

A trial was made to prepare a liquid lens-forming material in the manner as in Example 1 except that instead of an indole-based ultraviolet absorbing agent (BONASORB UA-3912, CAS. No. 102311-49-9, made by Orient Chemical Industries Co., Ltd.; melting point: 142 to 146° C.), an indole-based ultraviolet absorbing agent (BONASORB UA-3911, CAS. No. 142676-93-5, made by Orient Chemical Industries Co., Ltd.; melting point: 202 to 205° C.) was used. But since the indole-based ultraviolet absorbing agent was not completely dissolved into the resin, production of the lens was aborted by not injecting the lens-forming material into the lens forming cavity.

As is apparent from the relationships between the wavelength and transmittance shown in FIGS. 1 to 7, since a benzotriazole-based ultraviolet absorbing agent is used in Comparative Example 1, the lens was capable of cutting only radiation having wavelengths of 380 nm and shorter, and incapable of cutting ultraviolet and visible radiation of the entire wavelength range of 430 nm and shorter.

The combination of dyes in Comparative Example 2 was also not capable of sufficiently or completely cut ultraviolet and visible radiation having wavelengths of 430 nm and shorter. The transmittance was too low and thus the view was too dark. Thus, this lens does not allow the user to adjust its color tone sufficiently to his or her liking.

In Examples 1 to 5, since a predetermined indole-based (UA3912) ultraviolet absorbing agent is used by a predetermined amount, it is possible to cut ultraviolet and visible radiation having wavelengths of 430 nm and shorter or wavelength of 500 nm and shorter. Also, the light shielding lens for protective eyeglasses of any of Examples 1 to 5 allows the user to adjust its color tone sufficiently to his or her liking.

What is claimed is:

1. A light-shielding lens for protective eyeglasses, comprising a synthetic resin and an ultraviolet absorbing dye added to the synthetic resin, wherein the lens cuts ultraviolet and visible radiation having wavelengths of a predetermined value and shorter, wherein said synthetic resin is diethylene glycol bis(allyl carbonate), and comprises 0.8 to 2 parts by mass of an indole-based ultraviolet absorbing agent having a melting point of 140 to 150° C., based on 100 parts by mass of the synthetic resin, and wherein the predetermined value is 430 nm.

2. The light-shielding lens for protective eyeglasses of claim 1, further comprising an oil-soluble dye as an additional ultraviolet absorbing agent.

3. The light-shielding lens for protective eyeglasses of claim 2, wherein the oil-soluble dye is a yellowish oil-soluble dye.

4. The light-shielding lens for protective eyeglasses of claim 2, wherein the lens cuts ultraviolet and visible radiation having wavelengths of 500 nm and shorter.

5. The light-shielding lens for protective eyeglasses of claim 1, wherein the lens comprises a polarizing film layer integrated with the lens.

6. The light-shielding lens for protective eyeglasses of claim 3, wherein the lens cuts ultraviolet and visible radiation having wavelengths of 500 nm and shorter.

7. The light-shielding lens for protective eyeglasses of claim 2, wherein the lens comprises a polarizing film layer integrated with the lens.

8. The light-shielding lens for protective eyeglasses of claim 3, wherein the lens comprises a polarizing film layer integrated with the lens.

9. The light-shielding lens for protective eyeglasses of claim 4, wherein the lens comprises a polarizing film layer integrated with the lens.

10. The light-shielding lens for protective eyeglasses of claim 6, wherein the lens comprises a polarizing film layer integrated with the lens.

* * * * *